United States Patent [19]

Roberts, Jr. et al.

[11] 4,038,779

[45] Aug. 2, 1977

[54] EDUCATIONAL AND MULTI-FUNCTION HYDROPONICS GARDEN CONTAINER

[76] Inventors: David B. Roberts, Jr., 211 4th Place, SW.; Joseph L. Wells, 10366 Antilles Drive, both of Largo, Fla. 33540

[21] Appl. No.: 621,538

[22] Filed: Oct. 10, 1975

[51] Int. Cl.² ............................................. A01G 31/00
[52] U.S. Cl. ............................................. 47/62; 47/64
[58] Field of Search .................... 47/1.2, 14, 15, 16, 47/34, 34.13, 37, 38, 48.5, 62, 64; 239/16, 17, 20, 21, 23; 222/372, 401

[56] References Cited

U.S. PATENT DOCUMENTS

| 1,036,368 | 8/1912 | Strumpf | 239/23 |
|---|---|---|---|
| 1,493,727 | 5/1924 | Bennett | 222/372 |
| 2,175,113 | 10/1939 | Fischer | 47/1.2 |
| 2,870,574 | 1/1959 | Sheridan | 47/1.2 |
| 2,993,300 | 7/1961 | Sawyer | 47/1.2 |
| 3,112,577 | 12/1963 | Burger | 47/37 |
| 3,524,279 | 8/1970 | Adams | 47/34.13 |
| 3,733,745 | 5/1973 | Ingerstedt et al. | 47/34 X |
| 3,830,013 | 8/1974 | Lesley | 47/1.2 X |

FOREIGN PATENT DOCUMENTS

| 94,063 | 1/1897 | Germany | 47/39 |
|---|---|---|---|
| 161,757 | 5/1933 | Switzerland | 47/34 T |

*Primary Examiner*—Edgar S. Burr
*Assistant Examiner*—James R. Feyrer
*Attorney, Agent, or Firm*—Clarence A. O'Brien; Harvey B. Jacobson

[57] ABSTRACT

An upstanding open top reservoir is provided and a foraminated plate is disposed within an upper portion of the reservoir with the latter and the plate including coacting structure supporting the panel or plate within the reservoir against downward displacement relative thereto. An upstanding sleeve is secured through a central portion of the plate and supported therefrom. The upper and lower ends of the sleeve include liquid outlet and liquid inlet structure, respectively, spaced above and below the plate and manually operable lift pump structure is disposed within the sleeve, includes an operator actuatable from the upper end of the sleeve and is operable, upon actuation of the operator, to lift liquid plant nutrient upwardly through the sleeve from the lower end thereof to the upper end thereof for flowing outwardly from the upper end of the sleeve through the liquid outlet structure.

12 Claims, 6 Drawing Figures

EDUCATIONAL AND MULTI-FUNCTION HYDROPONICS GARDEN CONTAINER

BACKGROUND OF THE INVENTION

Various forms of hydroponic garden containers have been heretofore designed and some of these previous types of hydroponic garden containers are constructed so as to be of educational benefit. However, these previously known hydroponics garden containers are not all constructed for ease in disassembly for cleaning purposes and reassembly after cleaning nor are they all provided with a substantially foolproof pump structure whereby plant nutrient solution may be pumped from the lower reservoir portion of a hydroponics garden container upwardly to a plant growing medium supported in an uppe portion of the container.

Examples of previously known hydroponics garden containers and accessories are disclosed in U.S. Pat. Nos. 1,108,334, 2,175,113, 2,281,068, 2,465,227, 2,854,792, 2,870,574, 2,983,076, 2,993,300, 3,112,577, 3,199,250, 3,323,253, 3,467,609, and 3,676,953.

BRIEF DESCRIPTION OF THE INVENTION

The hydroponics garden container of the instant invention is constructed in a manner whereby the development of the root system of plants growing in the container may be readily viewed from the exterior thereof and the container may be readily disassembled for cleaning and readily reassembled after cleaning. Further, the hydroponics garden container includes novel lift pump structure whereby plant nutrient solution from a lower portion of the reservoir of the container may be pumped upwardly through the central portion of the reservoir and discharged outwardly over a growing medium supported in an upper portion of the reservoir of the container.

Still further, the lower or base portion of the container includes illumination means whereby the interior of the container may be lighted and the walls of the container are constructed of transparent material whereby the illuminated root system of plants growing in the container may be readily viewed from the exterior thereof.

A main object of this invention is to provide a hydroponics garden container constructed in a manner whereby it may be utilized for educational purposes during various stages of the growth of plants within the container.

Another object of this invention is to provide an apparatus in accordance with the preceding objects and constructed in a manner whereby it may be readily disassembled for cleaning and reassembled after cleaning.

Still another important object of this invention is to provide a hydroponics garden container constructed in a manner whereby the root systems of plants growing within the container may be illuminated from within the latter and readily viewed from the exterior of the container.

A further object of this invention is to provide a hydroponics garden container including novel lift pump structure projecting upwardly through a central portion of the container and operable to pump plant nutrient solution from a lower portion of the reservoir of the container upwardly through the center thereof to a level above and for discharging on a plant growing medium supported in an upper portion of the container.

A final object of this invention to be specifically enumerated herein is to provide a hydroponics garden container in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
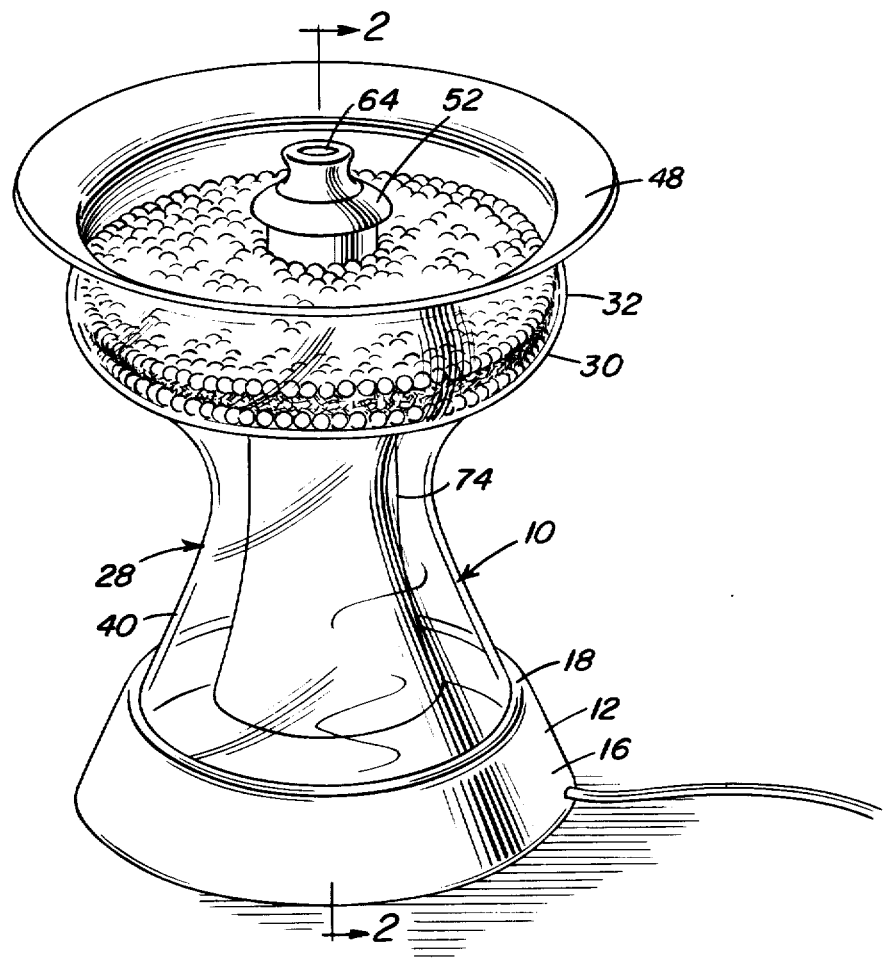
FIG. 1 is a perspective view of the hydroponics garden container.
Figure 4:
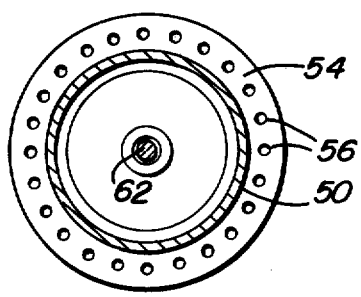
FIG. 4 is a horizontal sectional view, taken substantially upon the plane indicated by the section line 4—4 of FIG. 2.

Referring now more specifically to the drawings, the numeral 10 generally indicates the hydroponics garden container of the instant invention. The container 10 includes a hollow generally truncated conical base referred to in general by the reference numeral 12 and constructed of shape-retentive but bendable and deformable material, such as plastic or hard rubber. The base 12 includes a partial outer annular bottom wall 14 and upwardly inclined peripheral side walls 16 which terminate upwardly in inwardly curving upper extremities 18. The base 12 includes a pluraity of peripherally spaced vertical gussets 20 and the gussets 20 are in the form of panel-like fillets extending between the bottom wall 14 and the lower portions of the side walls 16. The central portion of the bottom wall 14 is upwardly recessed and includes a centrally apertured closure panel 22 secured in position by means of threaded fasteners 24, a plurality of electrically actuated illumination means 26 being supported from the upper surface of the closure panel 22.

The container 10 additionally includes an open top reservoir referred to in general by the reference numeral 28, including an upper bowl-shaped portion 30 whose side walls 32 curve inwardly at their lower extremities, as at 34, and the reservoir 28 additionally includes a truncated cone-shaped lower portion 36 including a substantially horizontal bottom wall 38 supported from the upper surfaces of the gussets or fillets 20 and upwardly inclined side walls 40 whose upper extremities curve upwardly and merge smoothly into the lower ends of the side walls 32, thereby defining a reservoir including upper and lower end portions of larger diameters than the vertical mid-portions of the reservoir 28. The upper portions of the side walls 16 disposed above the gussets or fillets 20 may be distorted so as to be bent outwardly, thereby enabling the lower end extremity of the lower portion 36 to be upwardly withdrawn from and reinserted within the base 12.

The container 10 further includes a plate 42 having a plurality of circumferentially and radially spaced arcuate slots 44 formed therethrough. The outer periphery of the plate 42 is beveled, as at 46, so as to conform to and be supported in flush contact with the inwardly curving lower portions 34 of the side walls 32. Thus, it may be seen that the plate 42 may be downwardly displaced through the open top 48 of the reservoir 28 for resting in a position on the inner surfaces of the lower extremities of the side walls 32. Further, the plate 42 includes an integral central depending mounting sleeve portion 45 internally threaded with course threads 47.

A vertically disposed cylindrical tube 50 is provided with exterior course threads 51 and is threadedly secured through the mounting sleeve portion 45 and is supported from the latter with the lower end of the tube 50 spaced at least slightly above the bottom wall 38 of the reservoir 28. The upper end of the tube 50 projects considerably above the plate 42 and is closed by means of a mushroom head-shaped closure 52 which is hollow and includes an annular bottom wall portion 54 projecting radially outwardly from the upper end of the tube 50. The bottom wall portion 54 is equipped with circumferentially spaced liquid plant nutrient outlet openings 56 and the central upper wall portion 58 of the closure 52 includes a seal equipped guide bore 60 formed therethrough. A piston rod 62 has its upper end slidably received through the bore 60 and a lifting knob 64 is carried by the end portion of the rod 62 disposed above the central upper wall portion 58. The lower end of the piston rod 62 is disposed within the tube or sleeve 50 and has a piston 66 mounted thereon. The piston 66 is snugly slidably received within the tube 50 and defines an axial inlet passage 68 formed therethrough. A sliding valve member 70 is slidably disposed on the rod 62 above the piston 66 and is operable, upon sliding downwardly along the rod 62 by gravity, to seatingly engage the piston 66 and close the inlet passage 68 to the flow of liquid nutrient solution therethrough. However, it may be readily appreciated that the knob 64 may be upwardly displaced so as to cause the piston 66 and the valve 70 supported therefrom to slide upwardly through the tube 50 and to thereby elevate liquid nutrient solution within the tube 50 to the upper end thereof and into the hollow closure 52 for discharging downwardly through the outlet openings 56 in a fountain-like effect. Of course, when the knob 64 is lowered, the piston 66 is downwardly displaced in advance of the valve member 70 to allow a replenishing supply of liquid nutrient solution to flow through the passage 68. As soon as the valve member 70 completes its downward movement by gravity along the rod 62 and sealingly engages the piston 66, the knob 64 may again be elevated in order to elevate additional liquid nutrient solution within the tube 50 for discharging outwardly through the outlet opening 56.

A reflective sleeve 74 is disposed about the tube 50 in spaced relation relative to the latter and the upper end of the sleeve 74 is disposed immediately beneath the plate 42. Vertical intermediate portions of the sleeve 74 are provided with circumferentially spaced internal gussets 76 and the sleeve 74 may be constructed of any suitable transparent material, such as plastic or glass, but the inner surface of the sleeve 74 is covered with a colored reflective coating 78, thereby giving the sleeve 74 mirror-like reflecting properites. The inner surfaces of the gussets closely oppose the outer surfaces of the sleeve 50 and the upper ends of the gussets are rounded to assist in guiding the lower end of the sleeve 50 downwardly through the sleeve 72, the gussets serving to limit lateral displacement of the lower end of the sleeve 50. As hereinbefore set forth, the reservoir 28 is also constructed of transparent material and it may therefore be appreciated that the illuminations means 26 within the base 12 and spaced about the latter will operate, when actuated, to cast light upwardly through the interior of the reservoir 28 exteriorly of the sleeve 74.

Figure 5:
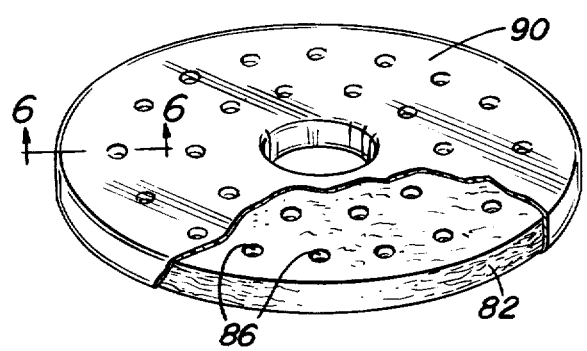
FIG. 5 is a perspective view of a plant growing medium disc provided with a protective cover for protecting the disc before its use as well as upwardly opening recesses in the upper surface thereof in which seeds to be germinated within the container are received and closed prior to use by the cover for the disc, portions of the cover being broken away.
Figure 6:
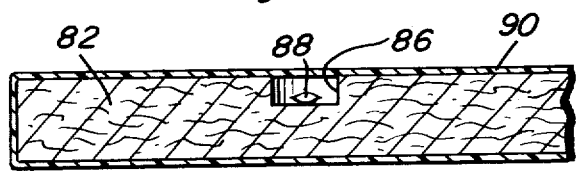
FIG. 6 is an enlarged fragmentary vertical sectional view, taken substantially upon the plane indicated by the section line 6—6 of FIG. 5.
Figure 2:
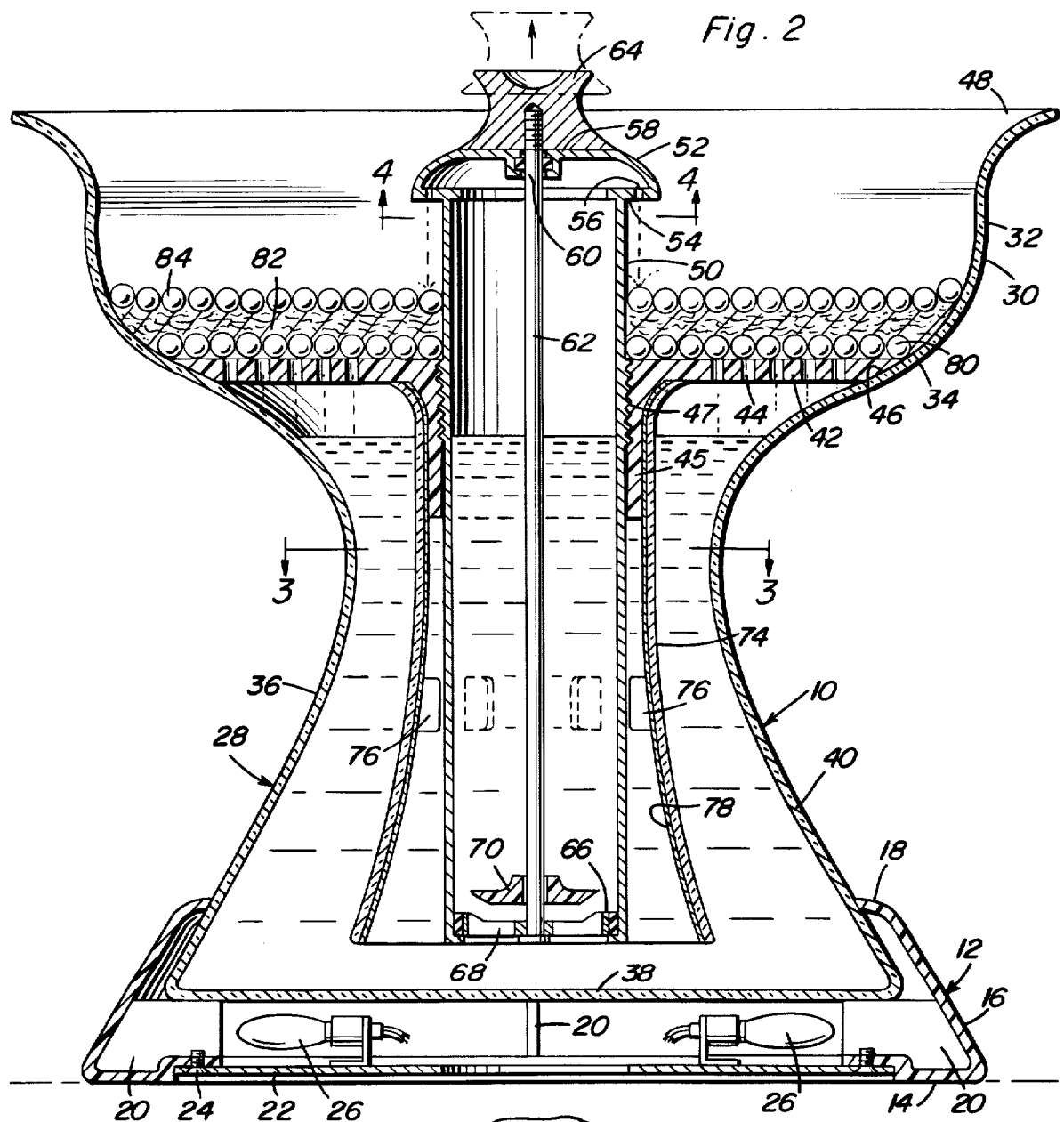
FIG. 2 is an enlarged fragmentary vertical sectional view, taken substantially upon the plane indicated by the section line 2—2 of FIG. 1.
Figure 3:
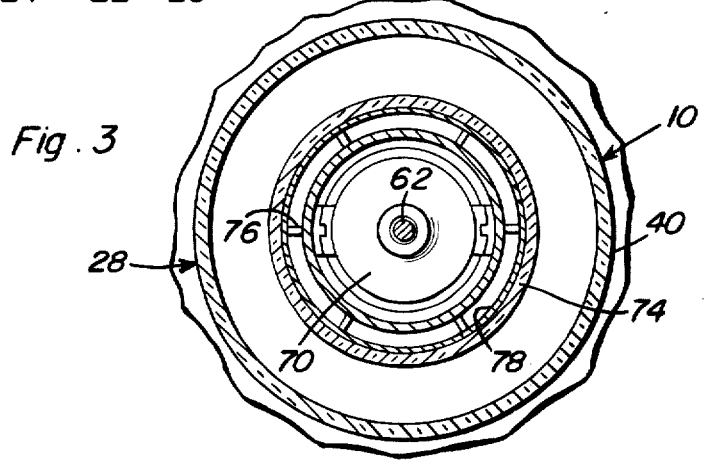
FIG. 3 is a horizontal sectional view, taken substantially upon the plane indicated by the section line 3—3 of FIG. 2.

With attention now invited more specifically to FIGS. 2, 5 and 6 of the drawings, it may be seen that a layer of spherical members, such as clear glass beads, 80 is disposed over the upper surface of the plate 42 and that a disc 82 of a growing medium, such as pressed sphagnum moss, expandable upon being wetted, is disposed over layer 80. Thereafter, a second layer 84 of clear glass beads may be placed over the disc 82. As may best be seen from FIGS. 5 and 6 of the drawings, the disc 82 includes shallow upwardly opening recesses 86 formed in its upper surface in which seeds 88 to be germinated are received. The disc 82, with the seeds 88 received in the recesses 86, is covered by means of a removable protective covering 90 and the covering 90 may be conveniently constructed of cellophane or other suitable and readily removable material.

By providing the disc 82 with a covering 90, the disc 82 may be marketed with the seeds 88 alreadly disposed in the recesses 86 ready for use after the cover 90 is removed.

It is believed that from the foregoing description, the manner of disassembly and assembly of the container 10 may be readily understood. After the container 10 has been assembled and the layers 80 and 84 as well as the disc 82 have been placed in position subsequent to the cover 90 of the disc 82 being removed, plant nutrient solution may be pumped upwardly through the tube 50 in the manner hereinbefore set forth. Of course, the plant nutrient will discharge downwardly in a fountain-like effect through the outlet openings 56 and thus wet the sphagnum moss disc 82. The seeds 88 within the recesses 86 will thereafter soon germinate and grow upwardly through the upper layer 84 of beads. Eventually, the roots of the plants will grown downwardly through the layer 80 of glass beads and also through the slots 44 into the liquid plant nutrient. Those portions of the roots of the plants growing within the container 10 disposed below the plate 42 will be readily viewable through that portion of the reservoir 28 disposed below the plate 42, especially when the illumination means 26 are actuated. Further, as the plants growing upwardly through the upper layer 84 of beads reach a predetermined height, a third layer of glass beads may be added on top of the second layer 84 in order to provide additional support for the main stalk portions of the growing plants.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a hydroponics container having a lower portion for containing liquid plant nutrient and provided with at least one upstanding transparent wall portion, said container including an upper generally horizontal foraminated portion for support of plants to be grown in said container with the roots of the plants projecting downwardly through said foraminated portion to a position horizontally registered with said transparent wall portion, mirror surface defining structure disposed within said container spaced horizontally inwardly of said transparent wall portion, the area of the interior of said container between said mirror surface defining structure and said transparent wall portion being adapted to receive descending root systems of plants growing in said container, and illumination means operative to cast light upwardly through said area and incident upon said mirror surface defining structure as well as the inner surface of said transparent wall portion, whereby the descending roots of plants being grown on said forminated portion and disposed in said area may be viewed from all sides through said transparent wall portion from the outer side thereof at close range.

2. A hydroponics garden container including an upstanding reservoir having an upwardly opening bowl-shaped upper portion opening centrally and downwardly into a lower portion of said reservoir closed at its lower end, said reservoir being constructed of transparent material at least throughout its major portion of its vertical extent and said upper portion including lower wall portions inclined inwardly and downwardly, a foraminated support plate downwardly receivable into the open upper portion of said reservoir from above and including outer peripheral portions supported from inner surfaces portions of said inclined lower wall portions, a hollow hand pump cylinder extending downwardly through a central portion of said plate and supported from the latter, said cylinder including an open lower end portion disposed in the lower portion of said reservoir, a piston reciprocal within said cylinder, the upper end of said cylinder being closed and having peripherally spaced outlet openings formed therein, an upstanding piston rod slidably and centrally received through the closed upper end of said cylinder and having the piston supported from the lower end thereof, said piston including a water flow passage therethrough and valve means associated therewith operative to allow water to flow upwardly through said water flow passage upon downward displacement of said piston in said cylinder and to prevent downward flow of water through said passage upon upward displacement of said piston in said cylinder, a seed germinating and plate growing medium supported on top of said plate about the upper end of said cylinder, and upstanding tubular mirror means dependingly supported from said plate about and enclosing the lower end portion of said cylinder projecting below said plate against viewing of said cylinder from the exterior of said reservoir, said mirror means being operative to reflect light incident thereon from the exterior of said mirror means, whereby descending roots from plants being grown in said medium and disposed between said tubular mirror means and the walls of said reservoir may be viewed on all sides through the reservoir from the exterior thereof at close range.

3. The combination of claim 2 wherein the under surfaces of said outer peripheral portions of said plate are beveled to conform to the slant of the opposing inner surface portions of said inwardly and downwardly wall portions.

4. A hydroponics garden container including an open top reservoir, a foraminated plate, said plate and container including first coacting means supporting said plate within an upper portion of said reservoir, an upstanding tube secured through a central portion of said plate and supported therefrom, the upper and lower ends of said tube including liquid outlet and inlet means, respectively, spaced above and below said plate, manually operable lift pump means disposed within said tube including an operator actuatable from the upper end of said tube, and operable, upon actuation of said operator, to lift water through said tube from the lower end thereof to the upper end thereof for flowing outwardly of said liquid outlet means and down toward said plate, said reservoir, throughout a major portion of its vertical extent below said plate being transparent, said tube including a light reflective sleeve disposed thereabout and supported therefrom below said plate, the outer surfaces of said sleeve being spaced inwardly of the opposing inner surfaces of said reservoir, illumination means disposed below the bottom of said reservoir and spaced about the outer periphery of said bottom, said bottom having light transmitting properties, said illuminating means being positioned to cast light upwardly through the bottom of said reservoir and the interior of the latter between the opposing inner and outer surfaces of said reservoir and sleeve, a disc of plant growth medium material disposed about said tube and supported from said plate, a layer of fine gravel size rigid material members disposed on said plate below said disc and a second similar layer overlying said disc.

5. The combination of claim 4 wherein said first coacting means includes downwardly and inwardly directed wall sections of said upper portion of said reservoir and outer peripheral portions of said plate which rest upon and are supported from the inner surfaces of said wall sections.

6. The combination of claim 4 wherein the upper end of said sleeve is anchored to inner peripheral portions of said plate.

7. The combination of claim 4 wherein the lower end of said sleeve is spaced above the bottom of said reservoir.

8. The combination of claim 4 including a disc of plant growth medium material disposed about said tube and supported from said plate.

9. The combination of claim 4 wherein said light reflective sleeve is colored.

10. The combination of claim 8 including a layer of fine gravel size rigid material members disposed on said plate below said disc and a second similar layer overlying said disc.

11. The combination of claim 10 wherein said disc includes a plurality of spaced apart upwardly opening recesses formed therein.

12. The combination of claim 11 wherein at least some of said recesses have a plant seed seated therein.

* * * * *